United States Patent

Chen et al.

Patent Number: 5,979,799
Date of Patent: Nov. 9, 1999

[54] FEED NOZZLE

[75] Inventors: Ye-Mon Chen, Sugar Land; James W. Nielson, Jr., Spring; David J. Brosten, Kingwood, all of Tex.

[73] Assignee: Shell Oil Company, Houston, Tex.

[*] Notice: This patent is subject to a terminal disclaimer.

[21] Appl. No.: 08/535,850

[22] Filed: Sep. 28, 1995

Related U.S. Application Data

[63] Continuation-in-part of application No. 08/399,868, Mar. 7, 1995, Pat. No. 5,794,857.

[51] Int. Cl.$^6$ .............................. B05B 7/04; C10G 11/18
[52] U.S. Cl. ...................... 239/430; 239/554; 239/559; 208/113
[58] Field of Search .................................. 239/429, 430, 239/433, 434.5, 548, 554, 556–559, 568, 589, 597; 208/157, 113

[56] References Cited

U.S. PATENT DOCUMENTS

| | | |
|---|---|---|
| 4,650,566 | 3/1987 | Buyan et al. . |
| 4,808,383 | 2/1989 | Buyan et al. . |
| 5,108,583 | 4/1992 | Keon . |
| 5,240,183 | 8/1993 | Bedaw et al. . |

FOREIGN PATENT DOCUMENTS

| | | |
|---|---|---|
| 423876 | 4/1991 | European Pat. Off. . |

*Primary Examiner*—Lesley D. Morris

[57] ABSTRACT

A feed nozzle for introducing steam and a heavy petroleum hydrocarbon into a reactor, including a nozzle body having a cylindrical inner steam conduit; and having a annular outer heavy petroleum hydrocarbon conduit, a first nozzle tip fixedly attached to the outlet end of the inner steam conduit, for the passage of the steam out of the inner steam conduit and into the heavy petroleum hydrocarbon, resulting in a mixture of steam and heavy petroleum hydrocarbon; the hemi-spherical outlet end having a row comprising a plurality of holes therein for the passage of the steam out of the inner steam conduit and into the heavy petroleum hydrocarbon passing through the outer heavy petroleum hydrocarbon conduit, resulting in a mixture of steam and heavy petroleum hydrocarbon; a second nozzle tip fixedly attached to the outer heavy petroleum hydrocarbon conduit, for passage of the mixture of steam and heavy petroleum hydrocarbon out of the feed nozzle assembly; the second nozzle tip being adapted to atomize the mixture of steam and heavy petroleum hydrocarbon, the second nozzle tip having a hemi-spherical outlet end, for passage of the mixture of steam and heavy petroleum hydrocarbon out of the feed nozzle assembly; wherein the hemi-spherical outlet end of the second nozzle tip extends beyond the hemi-spherical outlet end of the first nozzle tip, the hemi-spherical outlet end of the second nozzle tip having an elongated slit for passage of the mixture of steam and heavy petroleum hydrocarbon out of the feed nozzle assembly.

8 Claims, 7 Drawing Sheets

FEED NOZZLE

RELATED APPLICATIONS

This application is a continuation-in-part of application Ser. No. 08/399,868 filed Mar. 7, 1995, now U.S. Pat. No. 5,794,857.

I. FIELD OF THE INVENTION

The invention relates to a feed nozzle for introducing fluids into a vessel, particularly for introducing steam and hydrocarbon feed stock into a catalytic cracking unit.

II. BACKGROUND OF THE INVENTION

Many oil refinery and chemical plant units utilize nozzles for distributing liquid and/or gaseous feed to the unit. In some units, the ability of the nozzle to distribute the feed to the unit is very important to the productivity of the unit. For example, a catalytic cracking unit converts large chain hydrocarbon molecules found in crude oil into smaller and more valuable commercial products such as gasoline range hydrocarbons and diesel oils. Typically, vacuum distillates are introduced through feed nozzles in an upflow riser reactor where the feed is contacted with regenerated particulate solid catalysts. The catalyst selectively aids desirable cracking reactions.

For peak performance of the reactor, it is essential that the nozzle distribute the feed in a fine spray having a uniform coverage and a narrow droplet size distribution. Such a spray increases the surface area of the feed droplets and facilitates contacting with the catalyst particles. Existing nozzles have difficulty, however, in achieving this desired performance. Some nozzles use very small openings or complex tip designs which easily become plugged by various impurities in the feed or by coking. The down time and replacement expense in repairing such a blockage is very disadvantageous. Existing nozzles also cannot produce sufficiently fine droplets and/or a desirable spray pattern. Existing nozzles also are not adjustable in their angle of spray relevant to the axis of the feed conduits to which the nozzles are attached.

For riser reactors with currently available nozzle designs, the adjustment of the injection angle of the feed requires expensive modifications of the apparatus. It would be desirable to be able to only replace the feed nozzle in order to adjust the feed injection angle without the need for other equipment modifications.

Accordingly, it would be advantageous to have a nozzle capable of achieving a narrow distribution of fine droplets, a thin layer of uniform spray, and not having a tendency for blockage.

III. SUMMARY OF THE INVENTION

The invention includes a feed nozzle for introducing steam and a heavy petroleum hydrocarbon into a reactor, including a nozzle body having a substantially cylindrical inner steam conduit; and having a substantially annular outer heavy petroleum hydrocarbon conduit, a first nozzle tip fixedly attached to the outlet end of the inner steam conduit, for the passage of the steam out of the inner steam conduit and into the heavy petroleum hydrocarbon, resulting in a mixture of steam and heavy petroleum hydrocarbon;

the substantially hemi-spherical or hemi-elliptical outlet end having at least one row of a plurality of passageways therein for the passage of the steam out of the inner steam conduit and into the heavy petroleum hydrocarbon passing through the outer heavy petroleum hydrocarbon conduit, resulting in a mixture of steam and heavy petroleum hydrocarbon, where the axis of the plurality of passageways is at an angle from about 3° to about 60° above or below the longitudinal axis of the inner steam conduit; a second nozzle tip fixedly attached to the outer heavy petroleum hydrocarbon conduit, for passage of the mixture of steam and heavy petroleum hydrocarbon out of the feed nozzle assembly; the second nozzle tip being adapted to atomize the mixture of steam and heavy petroleum hydrocarbon, the second nozzle tip having a substantially hemi-spherical or hemi-elliptical outlet end, for passage of the mixture of steam and heavy petroleum hydrocarbon out of the feed nozzle assembly; where the substantially hemi-spherical or hemi-elliptical outlet end of the second nozzle tip extends beyond the substantially hemi-spherical or hemi-elliptical outlet end of the first nozzle tip, the substantially hemi-spherical or hemi-elliptical outlet end of the second nozzle tip having at least one elongated slit for passage of the mixture of steam and heavy petroleum hydrocarbon out of the feed nozzle assembly, and where the axis of the elongated slit is at an angle from about 3° to about 60° above or below the longitudinal axis of the outer heavy petroleum hydrocarbon conduit.

V. DETAILED DESCRIPTION OF THE INVENTION

An aspect of the instant invention is a device for feeding a heavy petroleum hydrocarbon into a catalytic cracker riser reactor.

A. NOZZLE BODY

The nozzle apparatus includes a nozzle body having a substantially typically annular outer heavy petroleum hydrocarbon conduit. The heavy petroleum hydrocarbon conduit has an overall outer diameter of from about 2 inches to about 9 inches, or 4 inches to about 9 inches or about 5 inches to about 7 inches in typical embodiments. The outer surface of the inner steam conduit forms an inner surface of the annular outer heavy petroleum hydrocarbon conduit. Each of the conduits has an inlet end and an opposite outlet end.

The nozzle body is typically oriented horizontally, vertically, or diagonally into the riser reactor. Other orientations are possible. When vertically oriented, the nozzle body typically will extend upward from the bottom or inlet end of the riser reactor. When not vertical, the nozzle body will typically protrude through the walls of the riser reactor in an orientation between vertical and horizontal. Different orientations will typically require different outlet designs since the ideal spray pattern depends on the nozzle orientation. The nozzle assembly of the invention is suited for any of these orientations since the configuration of the outlet end slits can be modified to achieve the desired spray pattern.

Typically with a vertically oriented nozzle body, the outlet slits will be a half-moon or crescent shape or other non-linear shape in order to configure the spray to fit the conduit. In a side entry nozzle body, the outlet slits are substantially straight lines when viewed from straight on as in FIG. 5B.

B. FIRST NOZZLE TIP

1. Inlet End

A first nozzle tip is fixedly attached to the outlet end of the inner steam conduit, for the passage of the steam out of the inner steam conduit and into the heavy petroleum hydrocarbon passing through the outer heavy petroleum hydrocarbon conduit. The attachment is by any conventional means such as threaded attachment or welded attachment. Such attachment is also applicable to other fixedly attached elements of the apparatus. The passage of the steam into the hydrocarbon results in a mixture of steam and heavy petroleum hydrocarbon. The first nozzle tip typically has a substantially cylindrical inlet end for attachment to the outlet end of the inner steam conduit.

2. Outlet End

Opposite the inlet end of the first nozzle tip is an outlet end. The outlet end is typically a substantially hemi-spherical or hemi-elliptical outlet end. It is for passage of the steam out of the inner steam conduit and into the heavy petroleum hydrocarbon passing through the outer heavy petroleum hydrocarbon conduit. This results in a mixture of steam and heavy petroleum hydrocarbon.

3. Outlet Passageways

The typically hemi-spherical or hemi-elliptical outlet end typically has at least one opening or passageway corresponding with each elongated outlet in the outlet end of the second nozzle tip. For example, if the second nozzle tip has two elongated outlet passageways, then the first nozzle tip will have at least two corresponding openings or passageways, e.g., slits.

Typically the openings in the first nozzle tip will consist of at least one row of small holes, numbering from about 7 to about 15 and ranging in size from about one-sixteenth inch to about one-fourth inch in diameter, which line up with each corresponding elongated slit in the second nozzle tip. However, the first nozzle tip may have more than one row of holes corresponding to each elongated slit in the second nozzle tip. The openings in the first nozzle tip are for the passage of the steam out of the inner steam conduit and into the heavy petroleum hydrocarbon passing through the outer heavy petroleum hydrocarbon conduit. This results in a mixture of steam and heavy petroleum hydrocarbon.

The angle formed from the substantially spherical or elliptical center of the typically substantially hemi-spherical or hemi-elliptical outlet end through the length of the two rows including a plurality of passageways therein is typically from about 45° to about 120°.

The center axis of the plurality of passageways, and consequently the angle of steam flow through the passageways, is at an angle from about 0° to about 60° from the longitudinal axis of the steam conduit. This angle will depend on the usage of the nozzles, but can be to either side of the longitudinal axis of the steam conduit. Typically, where the feed is side entry into the reactor the angle will be about 0°, or about 3° to about 45° below the longitudinal axis of the steam conduit. Where the feed is a bottom entry, the angle will be greater, for example, from about 0° to about 60°, or preferably from about 15° to about 45°, or from about 20° to about 40°, or from about 25° to about 35°. For bottom entry configurations, the angle is typically toward the center of the riser reactor from the longitudinal axis of the steam conduit. This angle for the first nozzle tip passageways in the outlet end will substantially equal the angle for slits in the outlet end of the second nozzle tip.

C. SECOND NOZZLE TIP

1. Inlet End

A second nozzle tip is fixedly attached to the outer heavy petroleum hydrocarbon conduit. The function of this second nozzle tip is for passage of the mixture of steam and heavy petroleum hydrocarbon out of the feed nozzle. The second nozzle tip is adapted to substantially uniformly atomize the mixture of steam and heavy petroleum hydrocarbon into a catalytic cracking reactor riser. The second nozzle tip has an inlet end for attachment to the outlet end of the outer heavy petroleum hydrocarbon conduit. The inlet end is typically substantially cylindrical.

2. Outlet End

Opposite the inlet end of the second nozzle tip is a substantially typically hemi-spherical or hemi-elliptical outlet end, for passage of the mixture of steam and heavy petroleum hydrocarbon out of the feed nozzle. The hemi-spherical or hemi-elliptical outlet end of the second nozzle tip extends beyond the hemi-spherical or hemi-elliptical outlet end of the first nozzle tip. The distance the hemi-spherical or hemi-elliptical outlet end of the second nozzle tip extends beyond the hemi-spherical or hemi-elliptical outlet end of the first nozzle tip is adapted to substantially uniformly atomize said mixture of steam and heavy petroleum hydrocarbon into a catalytic cracking reactor riser. This distance is typically from about one-quarter inch to about one and one-quarter inches. The substantially hemi-spherical or hemi-elliptical outlet end of the second nozzle tip has one, and preferably at least two, elongated slits therein for passage of the mixture of steam and heavy petroleum hydrocarbon out of the feed nozzle.

3. Outlet PassageWays

The elongated slits, optionally and preferably, have substantially parallel walls along their length. The angle formed from the substantially typically spherical or hemi-elliptical center of the substantially hemi-spherical or hemi-elliptical outlet end of the second nozzle tip through the length of the elongated slits is preferably substantially contiguous with the angle formed from the substantially spherical or elliptical center of the substantially hemi-spherical or hemi-elliptical outlet of the first nozzle tip through the width of the two rows including a plurality of passageways therein.

Figures 5A, 5B, 5C:
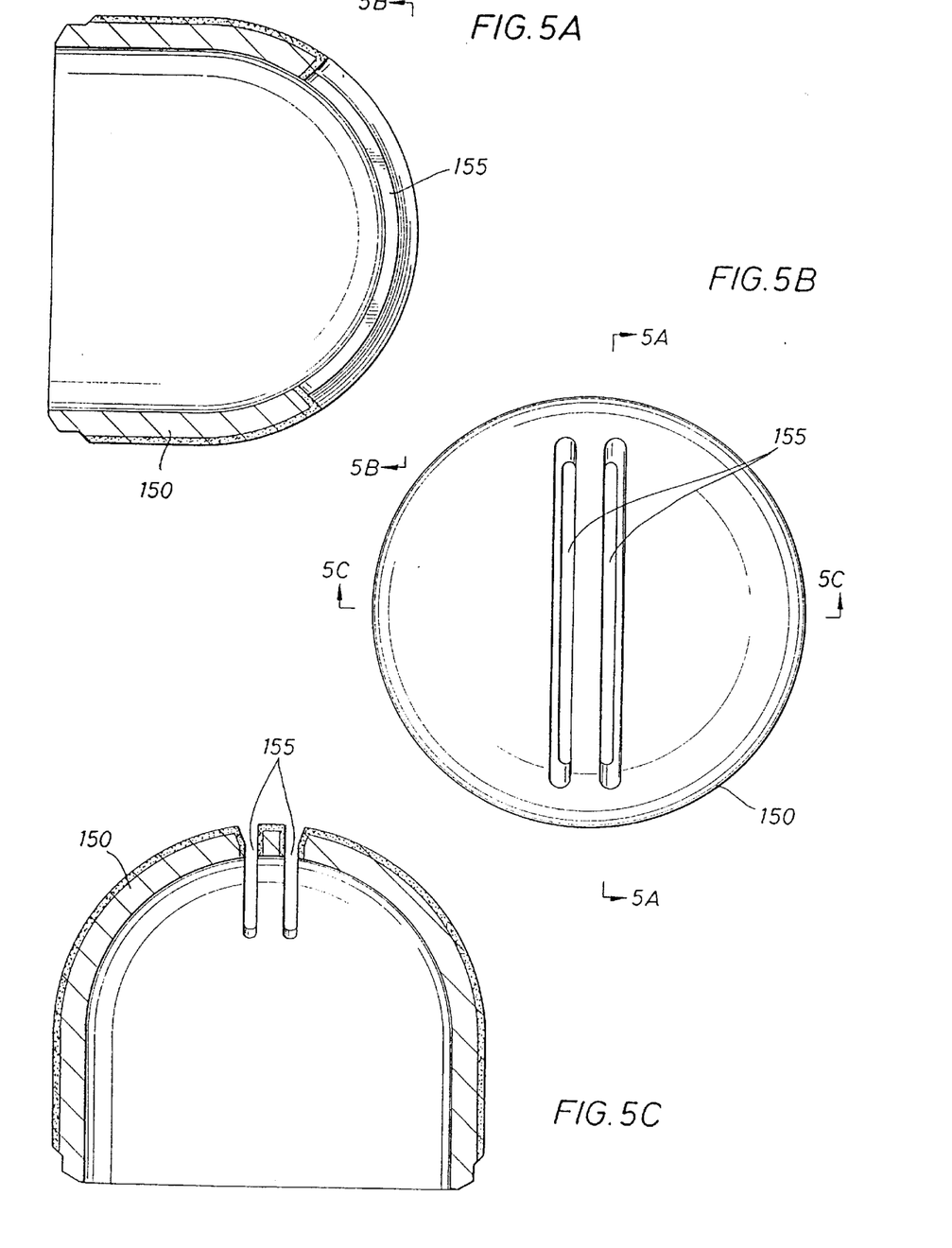
FIG. 5A is a cross-sectional view of the second (feed) nozzle tip taken along reference line 5A—5A in FIG. 5B.
FIG. 5B is a plan view of the second nozzle tip.
FIG. 5C is a cross-sectional view of the second nozzle tip taken along reference line 5C—5C in FIG. 5B.
Figure 5D:
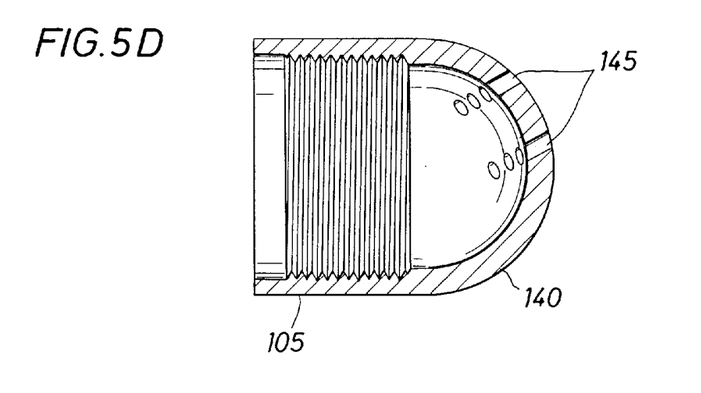
FIGS. 5D and 5E depict in particular embodiments the outlet ends of the first and second nozzles, respectively, where the angle between the outlet passageways and the conduit axis is greater than zero.
Figures 5E, 5F:
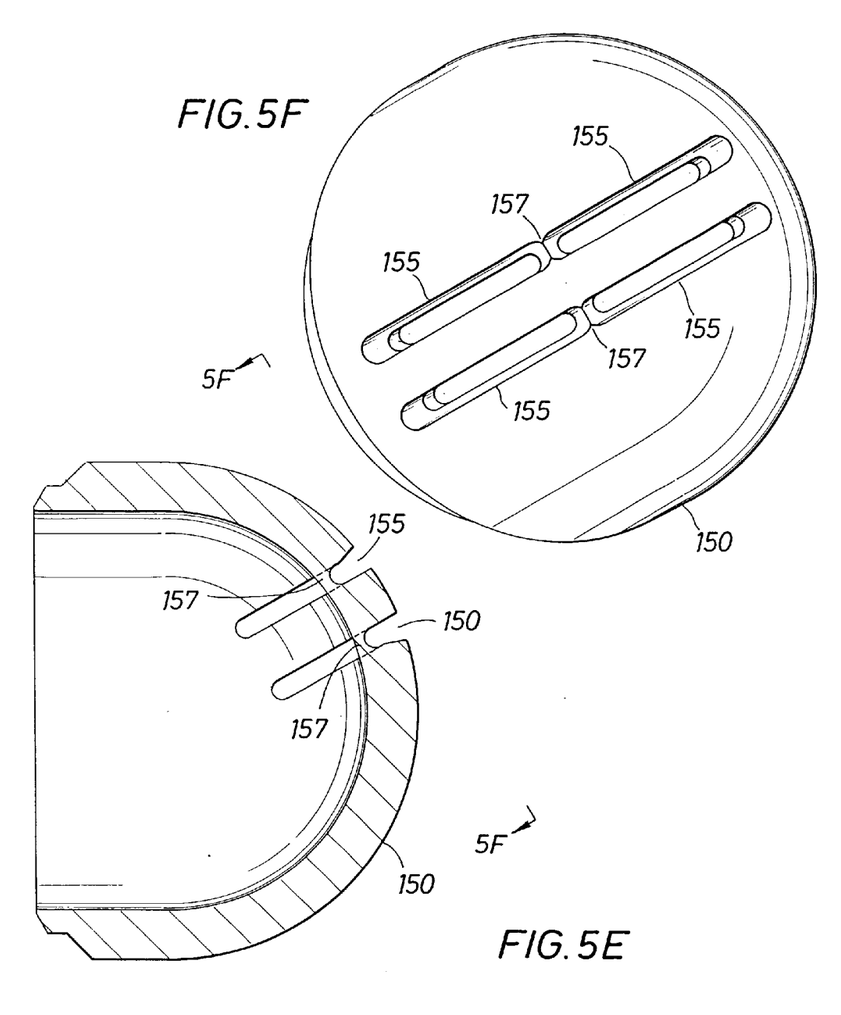
FIG. 5F depicts in one embodiment a head-on view of the elongated slits in the outlet end of the outer liquid conduit from the outer side of the outer liquid conduit. Each slit is integrally connected at one point along its walls to provide structural strength.
Figure 5G:
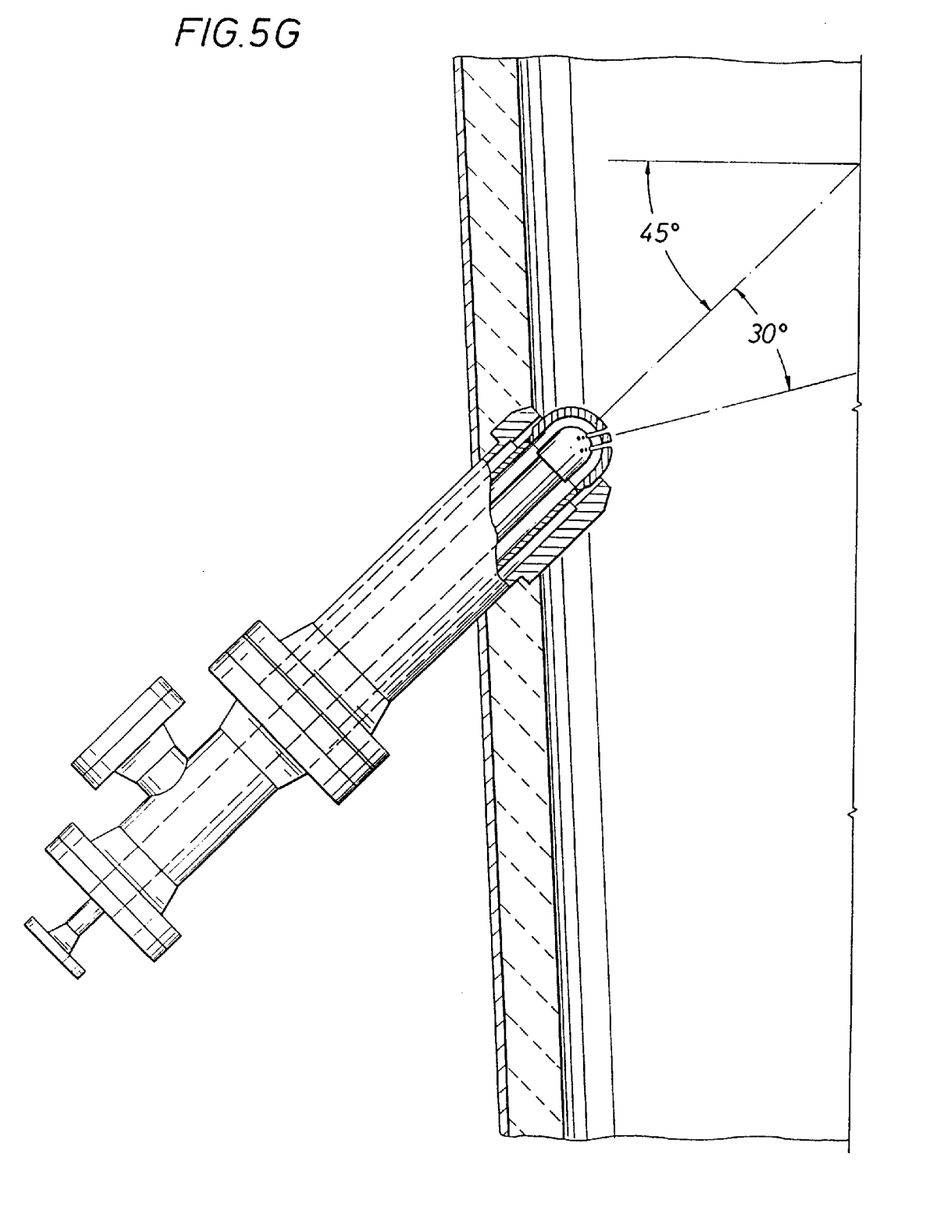
FIG. 5G depicts in one embodiment a side cut away view of the nozzle of this invention in a side entry riser reactor configuration.

The axis of said elongated slits, i.e., the axis at which the feed and steam will flow through the elongated slits, is at an angle from about 0° to about 60° from the longitudinal axis of said hydrocarbon conduit (shown as 30° in FIG. 5G). This angle will depend on the usage of the nozzles, but can be to either side of the longitudinal axis of the hydrocarbon conduit. Typically, where the feed is side entry into the riser reactor the angle will be about 0°, or about 3° to about 45° below the longitudinal axis of the hydrocarbon conduit. Where the feed is a bottom entry, the angle will be greater, for example, from about 0° to about 60°, or preferably from about 15° to about 45° or from about 20° to about 40°, or from about 25° to about 35°. For bottom entry configurations, the angle is typically toward the center of the riser reactor from the longitudinal axis of the hydrocarbon conduit. This angle for the slits in the outlet end of the second nozzle tip will substantially equal the angle for the plurality of passageways in the outlet end of the first nozzle tip.

The sides of the elongated slits are optionally connected at one or more locations along their length to provide structural strength to the strip of metal between two slits, where two are utilized. Preferably, such connection is shaped as two elongated slits end-to-end, in that the walls of the elongated sides gradually widen closer to the outer wall of the outlet end.

4. Erosion-Resistant Overlay

Optionally, an erosion-resistant material, e.g., STELLITE brand overlay material, is used as an overlay at erosion sensitive areas of the elongated slits and outlet end. Typically, such areas are the portions of the elongated slits and outlet end in contact with catalyst particles. Such particles are abrasive and thus an erosion resistant overlay prolongs the life of the outlet end.

D. PROCESS OF USING THE NOZZLE APPARATUS

1. Overview

In the process for catalytically cracking a heavy petroleum hydrocarbon a heavy petroleum hydrocarbon is preheated, mixed with steam, and fed into a catalytic cracking reactor riser. The heavy petroleum hydrocarbon is then contacted with a cracking catalyst to produce light hydrocarbons and spent catalyst coated with a thin coke layer. The light hydrocarbons are removed from the reactor. The spent catalyst coated with a thin coke layer is passed to a regenerator vessel. At least a portion of the coke is then burned off the spent catalyst. This results in a regenerated catalyst.

2. Feeding Steam

Steam is passed through the substantially cylindrical inner steam conduit into the heavy petroleum hydrocarbon. This results in the forming of a fine two-phase mixture by the steam bubbles jetting through the hydrocarbon mixture.

The passageways out of the outlet end of the steam conduit do not foul. Fouling due to coking of the heavy petroleum feed is avoided since the flow of heavy petroleum feed around the outside of the outlet end of the steam conduit has a cooling heat transfer function. Thus, the temperature at the passageways is sufficiently low that the contact of steam and heavy petroleum does not result in coking and blockage of the passageways.

3. Passing Feed Mixture Into Reactor

The fine two-phase mixture of steam and heavy petroleum hydrocarbons passes through the feed nozzle outlet into the catalytic cracking reactor. One benefit of the nozzle assembly of this invention is that, for example, where two outlet slits are used, two sheet-like fans of spray are produced initially which, possibly due to a vacuum effect between them, converge into one sheet while still in close proximity to the tip or outlet. Thus, fine atomization is obtained while also achieving a desirable uniform spray pattern, i.e., a flat sheet when the nozzle outlets are straight lines. It is noted that theorization as to the scientific principle which produces the single sheet of spray is not meant to limit the invention as other explanations may be applicable.

E. SIDE AND BOTTOM FEED ENTRY RISER REACTOR CONFIGURATIONS

The nozzle of the invention is suitable for both bottom entry and side entry feed configuration riser reactors. In the process of renovating a side entry configuration riser reactor, optionally, only the nozzle and associated steam and feed conduits are replaced. In bottom entry configurations, the nozzle of the invention is particularly beneficial in economic savings. There is a very high cost associated with renovating a bottom entry riser reactor into a side entry riser reactor. The renovation may be uneconomical if the improved performance of a side entry reactor is offset too much by the high renovation costs. Using the nozzle of the invention this economic problem is overcome. A bottom entry riser reactor can remain so and still have the benefits of a side entry riser reactor. In this embodiment of the invention the feed and steam conduits will rise, optionally, parallel to the wall and along the outer circumference of the inside of the riser reactor. The nozzle with angled outlets is then attached to the respective steam and feed conduits. This, in effect, simulates a side entry riser reactor without the high cost of actually having side entry.

VI. DETAILED DESCRIPTION OF THE DRAWINGS

Figures 1, 3:
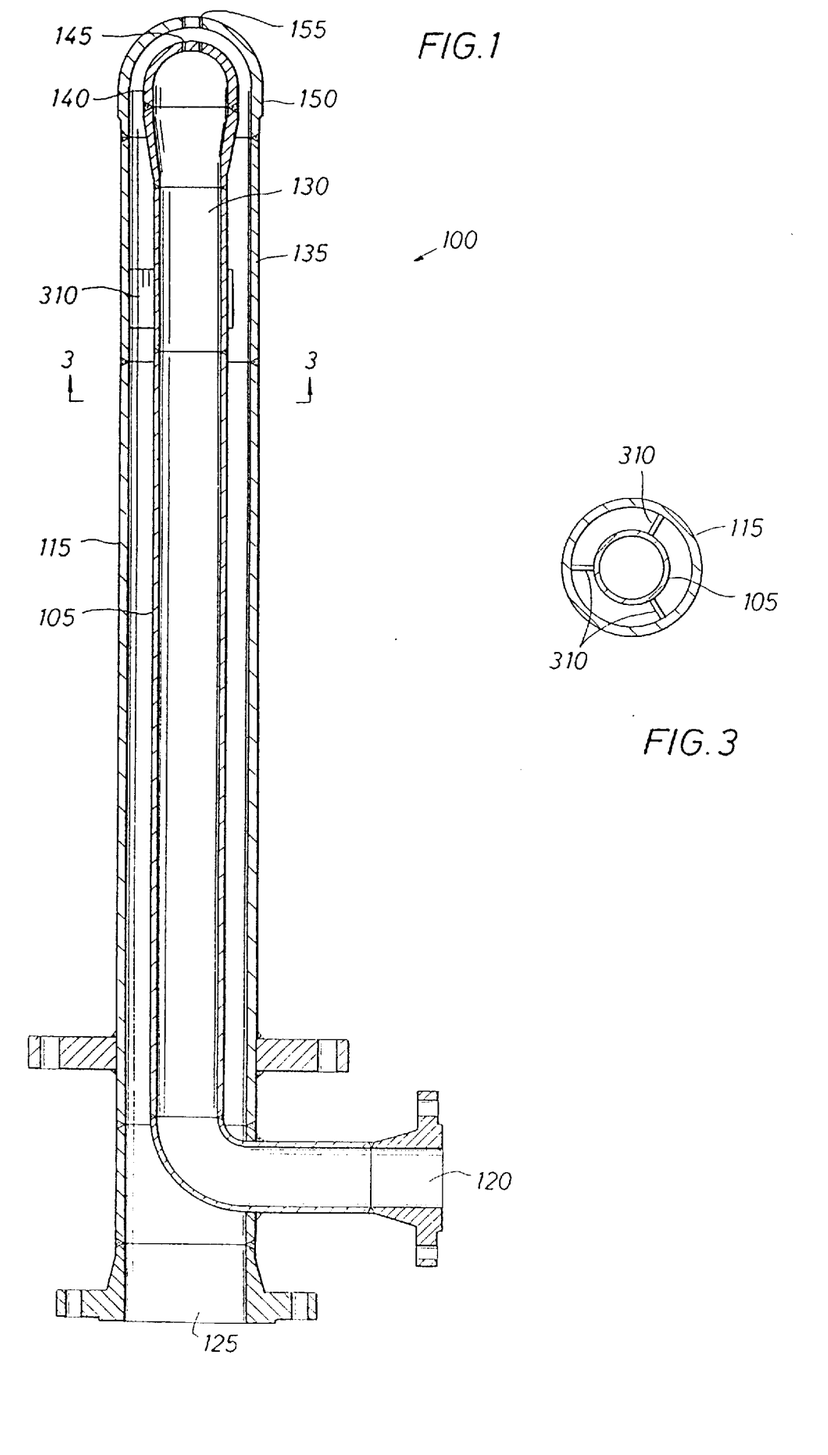
FIG. 1 is a cross-sectional view of the invention taken along the longitudinal axis.
FIG. 3 is a cross-sectional view taken along reference line 3—3 of FIG. 1.

A. FIG. 1

FIG. 1 depicts a side sectional view of one embodiment of the invention. Feed nozzle assembly 100 includes inner steam conduit 105 and outer substantially spherically or elliptically annular oil (or liquid) conduit 115. Inner steam (or gas) conduit 105 has inlet end 120 and outlet end 130. Outer annular oil conduit 115 has inlet end 125 and outlet end 135.

First nozzle tip 140 is attached at its inlet end to outlet end 130 of inner steam conduit 105. The outlet end of first nozzle tip 140, opposite its inlet end, is a substantially hemi-spherical or hemi-elliptical outlet end. The outlet end of first nozzle tip 140 has, in one embodiment, two rows of a plurality of passageways 145 for the passage of steam.

Second nozzle tip 150 is attached at its inlet end to outlet end 135 of outer annular oil conduit 115. The end of second nozzle tip 150 opposite its inlet end is a substantially hemi-spherical or hemi-elliptical outlet end. The outlet end of second nozzle tip 150 has, in one embodiment, two slits 155 (see FIG. 5B) for the passage of the feed and steam.

Figure 2:
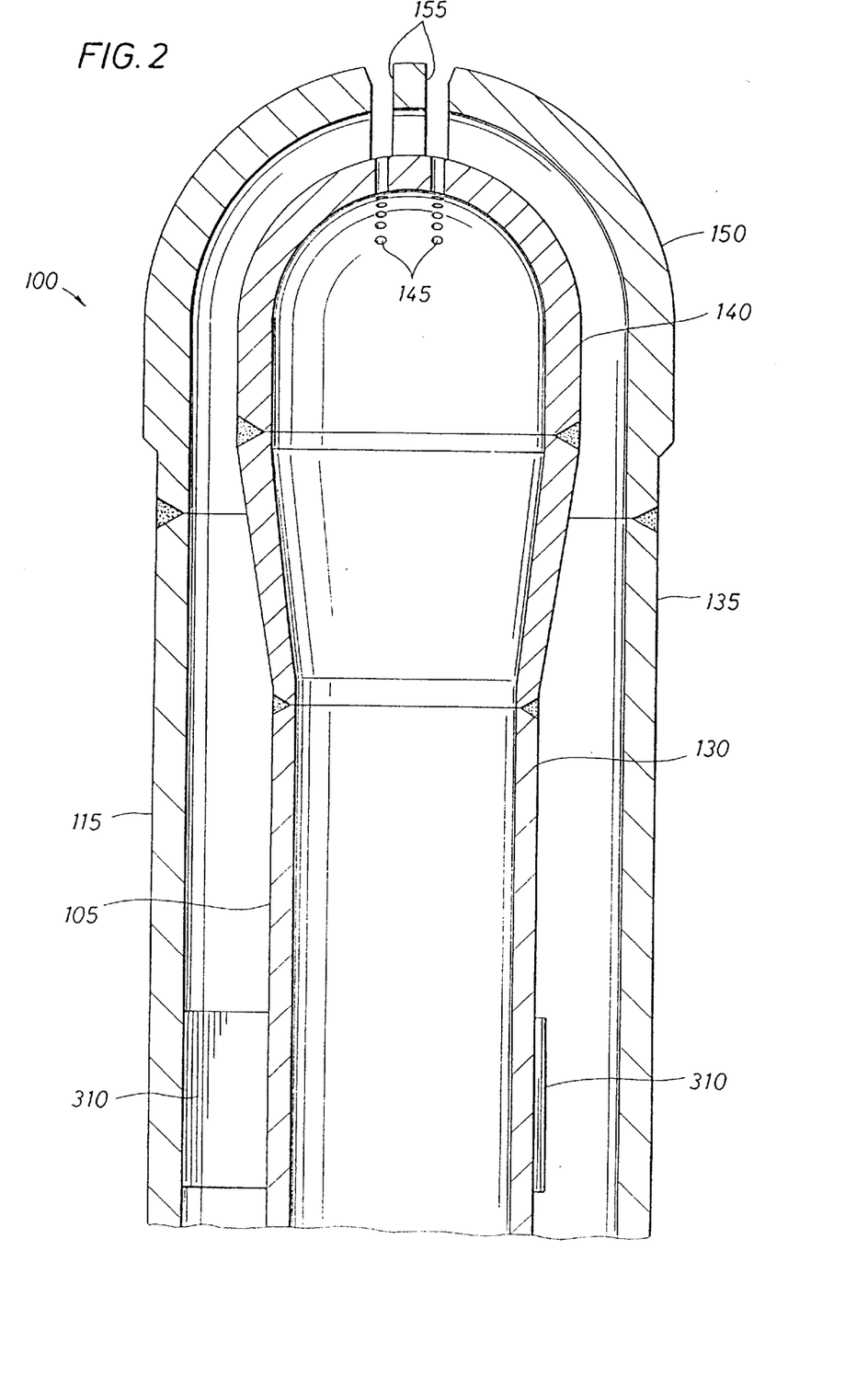
FIG. 2 is an enlarged view of the nozzle of FIG. 1.

B. FIG. 2

FIG. 2 shows an enlarged view, in one embodiment, depicting the first and second nozzles. The numbering of these elements is the same as used in FIG. 1.

C. FIG. 3

FIG. 3 is a cross-sectional view taken along reference line 3—3 of FIG. 1 of one embodiment of the feed nozzle assembly. Inner steam conduit 105 and outer annular oil conduit 115 are fixedly joined by spacer studs 310.

Figure 4A:
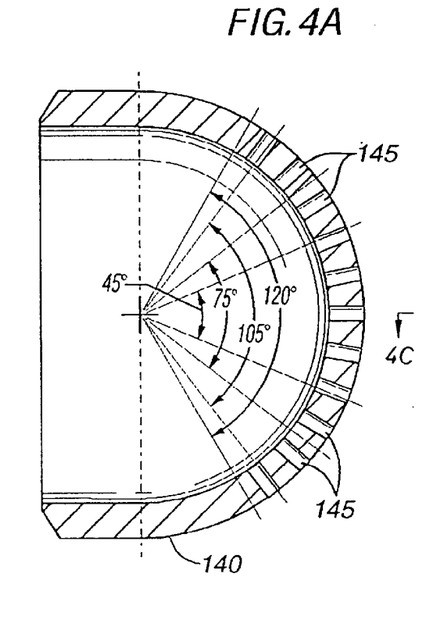
FIG. 4A is a cross-sectional view of the first (steam) nozzle tip taken along reference line 4A—4A in FIG. 4B.
Figure 4B:
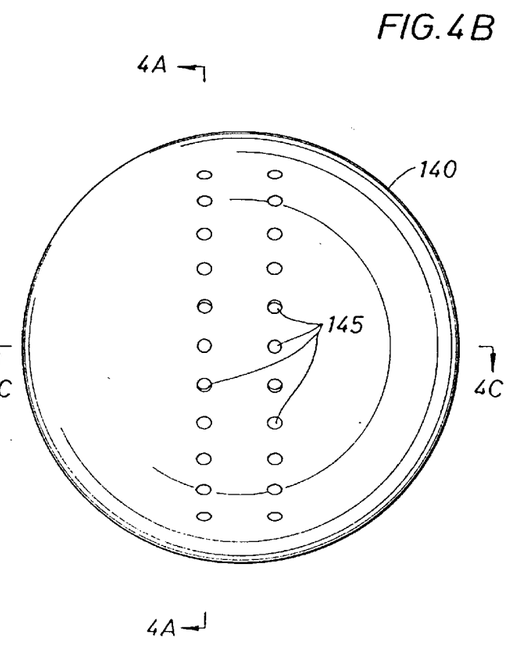
FIG. 4B is a plan view of the first nozzle tip.
Figure 4C:
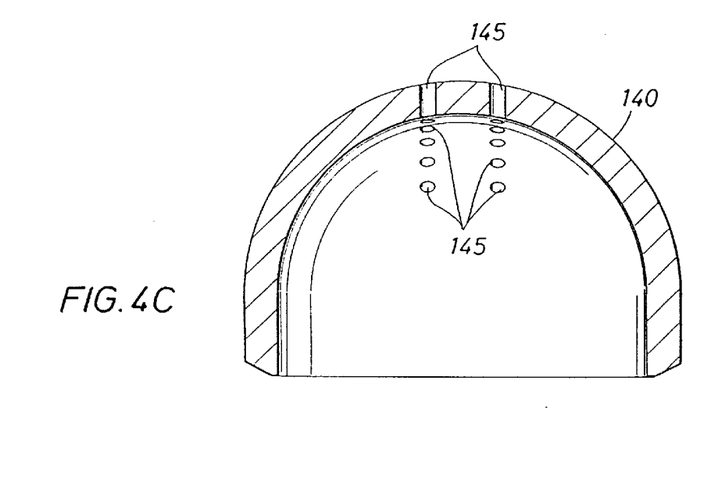
FIG. 4C is a cross-sectional view of the first nozzle tip taken along reference line 4C—4C in FIG. 4B.

D. FIGS. 4A, 4B, and 4C

FIG. 4A is a cross-sectional view of the first (steam) nozzle tip taken along reference line 4A—4A in FIG. 4B. FIG. 4B is a plan view of the first nozzle tip. FIG. 4C is a cross-sectional view of the first nozzle tip taken along reference line 4C—4C in FIG. 4B. First nozzle tip 140 is depicted along with rows of passageways 145.

E. FIGS. 5A, 5B, and 5C

FIG. 5A is a cross-sectional view of the second (feed) nozzle tip taken along reference line 5A—5A in FIG. 5B. FIG. 5B is a plan view of the second nozzle tip. FIG. 5C is a cross-sectional view of the second nozzle tip taken along reference line 5C—5C in FIG. 5B. Second nozzle tip 150 is depicted along with slits 155.

F. FIGS. 5D and 5E

FIGS. 5D and 5E depict in particular embodiments cross-sectional views of the outlet ends of the first and second nozzles tips, 140 and 150 respectively, where the angle between the outlet passageways of each and the corresponding conduit axis is greater than zero.

G. FIG. 5F

FIG. 5F is a plan view of the nozzle tip 150. Each slit 155 is integrally connected at one point 157 along its walls to provide structural strength.

H. FIG. 5G

FIG. 5G depicts in one embodiment a side cut away view of the nozzle of this invention in a side entry riser reactor configuration. The angle of the outlet openings in the steam (not shown) and hydrocarbon feed nozzles is below the longitudinal axis of the steam and hydrocarbon conduits (shown as 30° in FIG. 5G). This lower angle is achieved by simply replacing the nozzle. This saves the prohibitive cost of replacing the sleeve hardware attached to the vessel.

Figure 6A:
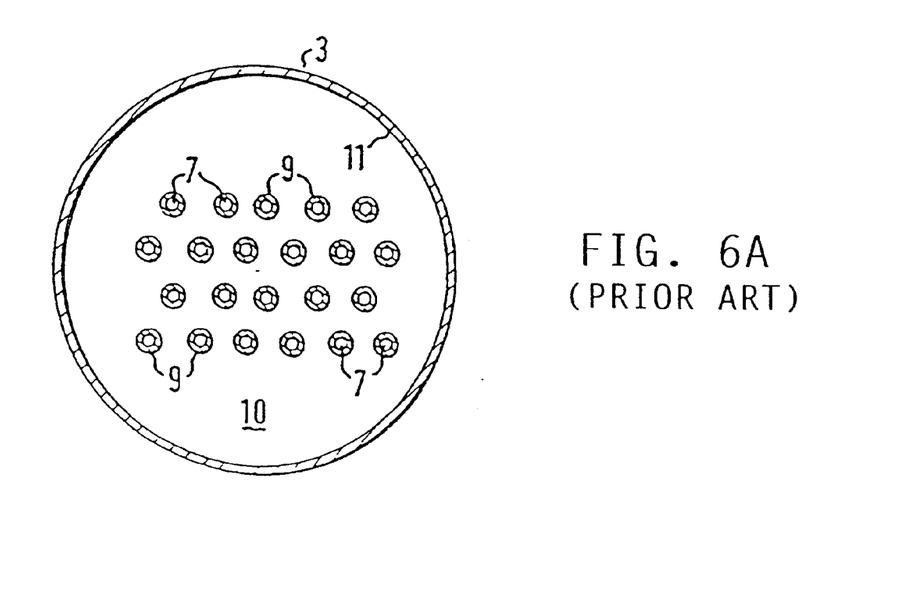
FIGS. 6A and 6B depicts a known nozzle from European Patent Application No. 0423876A1.
Figure 6B:
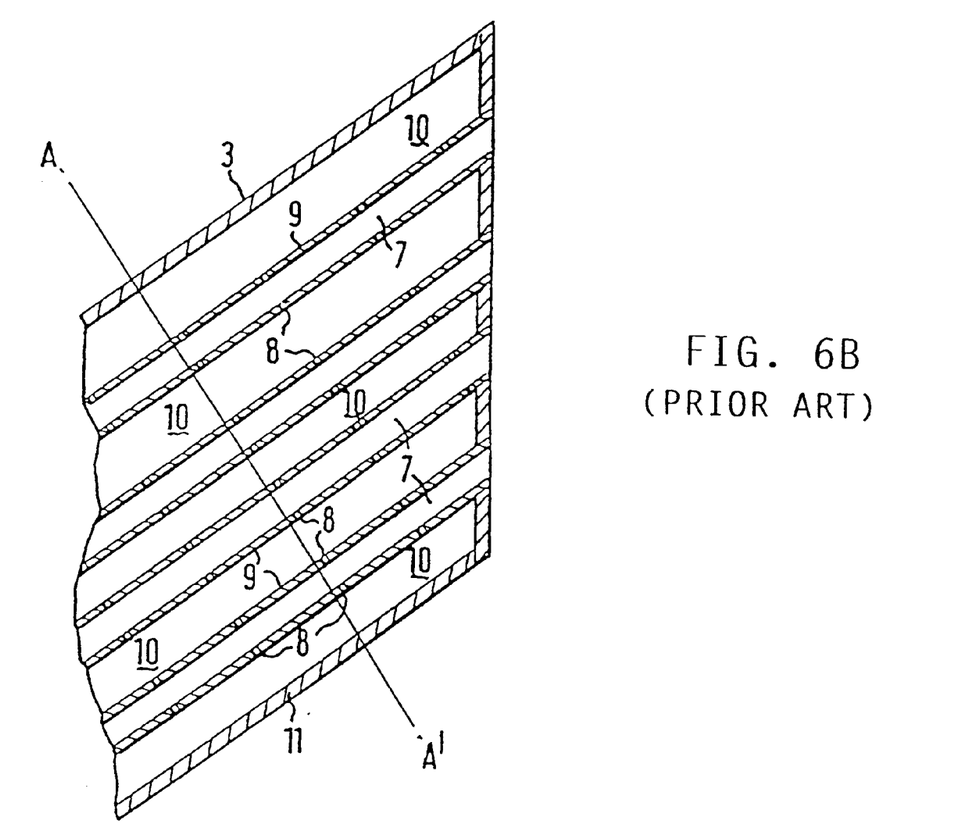

I. FIGS. 6A and 6B

FIGS. 6A and 6B depict a known nozzle from European Patent Application No. 0423876A1. This nozzle is used in the Experiment discussed in the illustrative Embodiment section below in comparing performance of it against an embodiment of the nozzle apparatus of the invention. As shown in FIGS. 6A and 6B, the known nozzle has an outer conduit 10 for hydrocarbon feed and multiple inner conduits 9 for steam. The multiple inner conduits 9 have multiple side outlets 8 for steam. The hydrocarbon feed passes through space 10 between the inner steam tubes (conduits) 9.

VII. ILLUSTRATIVE EMBODIMENT(S)

The invention is further described in the following illustrative embodiment(s). The illustrative embodiment(s) are for illustrative purposes only and are not intended to limit the scope of the invention in any way.

In the following illustrative embodiment an experiment was run to compare the numerous performance factors which resulted from operation of one embodiment of the nozzle apparatus of a the invention with that of known nozzle as depicted in European Patent Application No. 0423876A1, as depicted in FIGS. 6A and 6B.

For simplification of the experiment air and water were used rather than steam and a heavy petroleum hydrocarbon. Air was fed into the steam conduit and water was fed into the heavy hydrocarbon petroleum annular conduit. Feed rates, feed pressures, and temperatures were substantially the same for each nozzle.

The table below gives the results of the experiment.

|  | Known Nozzle: European Patent Application No. 0423876A1 | Nozzle Apparatus of the Invention |
| --- | --- | --- |
| Droplet Size | Excellent | Excellent |
| Spray Uniformity | Poor - High spray density in multiple discrete jets, low spray density between jets | Excellent - Uniform spray density |
| Riser Reactor Coverage | Fair | Excellent - 50% greater than known nozzle |
| Mixing With Catalysts | Poor mixing | Excellent - Fast mixing |
| Contact Zone | Poor - Multiple layer contacting | Excellent - Single layer contacting |
| Operation Window | Fair - Limited turndown | Excellent - Unlimited turndown |
| Compactness | Fair | Excellent - 30% reduction over known nozzle |
| Operation Without Steam | Poor - No atomization | Good - Can function as a single phase atomizer |
| Maintenance | Poor - No access to steam orifices | Excellent - Direct access to steam orifices |
| Off Axis Injection | Not possible | Possible |

As shown in the results above, the nozzle apparatus of the invention had a superior performance in 8 of the 9 categories. Small droplet size is important since surface area is increased. A uniform spray is desirable since this results in uniform utilization of catalyst. The coverage of the spray in the reactor is significant since the greater the coverage the greater the contacting with the catalyst. A fast mixing of the feed and catalysts is desirable to vaporize the feed. A single contact zone of the spray with the catalyst is important in order to control the contact time of the catalyst with the feed. The "operation window" refers to the range of the ratio of steam to hydrocarbon feed over which the nozzle can effectively operate. A large range is desirable since fluctuations routinely occur in steam availability during normal refinery operations. Operation without any steam flow is useful in the case of a total steam outage. It is very useful in reducing turnaround and down time to be able to have quick access to the steam orifices since they may sometimes become obstructed.

What is claimed is:

1. A feed nozzle assembly for introducing a gas and a liquid into a vessel, said feed nozzle assembly comprising:
   a. a nozzle body;
      (1) having a substantially cylindrical inner gas conduit, said conduit having an inner surface and an outer surface;
      (2) and having a substantially annular outer liquid conduit, wherein said outer surface of said inner gas conduit forms an inner surface of said annular outer liquid conduit; and
      (3) wherein each of said conduits has an inlet end and an opposite outlet end;
   b. a first nozzle tip fixedly attached to said outlet end of said inner gas conduit, for passage of gas out of said inner gas conduit and into liquid passing through said outer liquid conduit, thereby resulting in a mixture of gas and liquid, said first nozzle tip;
      (1) having a substantially cylindrical inlet end for attachment to the outlet end of said inner gas conduit;

(2) having an opposite substantially hemi-spherical or hemi-elliptical outlet end having a center, for passage of said gas out of said inner gas conduit and into said liquid passing through said outer liquid conduit, thereby resulting in a mixture of gas and liquid, said hemi-spherical or hemi-elliptical outlet end;
  (a) having at least one row comprising a plurality of passageways therein for the passage of said gas out of said inner gas conduit and into said liquid passing through said outer liquid conduit, thereby resulting in a mixture of gas and liquid;
  (b) wherein an angle formed from said center of said substantially hemi-spherical or hemi-elliptical outlet end through a length of said at least one row comprising a plurality of passageways therein is from about 75° to about 105°;
  (c) is comprised substantially of stainless steel; and
  (d) wherein the axis of said plurality of passageways is at an angle from about 3° to about 60° from the longitudinal axis of said steam conduit; and
c. a second nozzle tip fixedly attached to said outer liquid conduit, for passage of said mixture of gas and liquid out of said feed nozzle assembly; wherein said second nozzle tip is adapted to substantially uniformly atomize said mixture of gas and liquid into said vessel, said second nozzle tip:
  (1) having a substantially cylindrical inlet end for attachment to the outlet end of said outer liquid conduit;
  (2) having an opposite substantially hemi-spherical or hemi-elliptical outlet end, for passage of said mixture of gas and liquid out of said feed nozzle assembly;
    (a) wherein said hemi-spherical or hemi-elliptical outlet end of said second nozzle tip extends beyond said hemi-spherical or hemi-elliptical outlet end of said first nozzle tip,
    (b) wherein a distance said hemi-spherical or hemi-elliptical outlet end of said second nozzle tip extends beyond said hemi-spherical or hemi-elliptical outlet end of said first nozzle tip is from about one-quarter inch to about one and one-quarter inches,
    (c) said hemi-spherical or hemi-elliptical outlet end of said second nozzle tip having at least one elongated slit therein for passage of said mixture of gas and liquid out of said feed nozzle assembly;
      (i) said at least one elongated slit having substantially parallel walls along a length of said at least one elongated slit;
      (ii) wherein the longitudinal walls of each of said elongated slits are integrally connected at one or more locations to provide structural strength;
      (iii) wherein the axis of said at least one elongated slit is at an angle from about 3° to about 60° from the longitudinal axis of said outer liquid conduit;
    (d) wherein an angle formed from said center of said substantially hemi-spherical or hemi-elliptical outlet end of said second nozzle tip through a length of said elongated slit is substantially contiguous with an angle formed from said center of said substantially hemi-spherical or hemi-elliptical outlet of said first nozzle tip through a width of said at least one row comprising a plurality of passageways therein; and
    (e) is comprised substantially of stainless steel and having a portion thereof comprising an erosion-resistant overlay.

2. The feed nozzle assembly of claim 1:
a. wherein said outlet end of said nozzle body is substantially hemi-spherical;
b. wherein said at least one elongated slit is substantially centered on said substantially hemi-spherical outlet end of said second nozzle tip; and
c. wherein the axis of said at least one elongated slit is at an angle from about 15° to about 45° from the longitudinal axis of said outer conduit.

3. The feed nozzle assembly of claim 1:
a. having at least two elongated slits in said second nozzle tip;
b. having at least two rows of passageways in said first nozzle tip; and
c. wherein an inner diameter of said annular outer liquid conduit is from about 2 inches to about 9 inches and wherein said at least two elongated slits in said second nozzle tip are substantially crescent shaped.

4. The feed nozzle assembly of claim 3:
a. wherein an inner diameter of said annular outer liquid conduit is from about 5 inches to about 7 inches; and
b. wherein the longitudinal walls of each of said elongated slits are integrally connected at one or more locations to provide structural strength to the strip of metal between said two elongated slits.

5. The feed nozzle assembly of claim 1, wherein said passageways are holes and further comprising at least two rows having a plurality of said holes therein in said first nozzle tip.

6. The feed nozzle assembly of claim 5, wherein each of said two rows having a plurality of holes therein in said first nozzle tip, has from about 7 to about 15 holes therein.

7. The feed nozzle assembly of claim 5, wherein each of said plurality of holes has a diameter from about one-sixteenth inch to about one-quarter inch.

8. The feed nozzle assembly of claim 1 wherein the distance between said first nozzle tip and said second nozzle tip is from about one-half inch to about one inch.

* * * * *